United States Patent
Harvey

[11] 3,862,540
[45] Jan. 28, 1975

[54] EXHAUST MANIFOLD AIR INJECTION SYSTEM

[75] Inventor: Bruce J. Harvey, Westland, Mich.

[73] Assignee: The Bendix Corporation, Southfield, Mich.

[22] Filed: Feb. 22, 1974

[21] Appl. No.: 444,937

Related U.S. Application Data

[63] Continuation of Ser. No. 221,576, Jan. 28, 1972.

[52] U.S. Cl............................ 60/290, 60/294, 60/307
[51] Int. Cl.............................................. F02b 75/10
[58] Field of Search ............ 60/289, 290, 294, 280, 60/304, 305, 307; 123/119 C, 119 CE

[56] References Cited
UNITED STATES PATENTS

| | | | |
|---|---|---|---|
| 2,506,810 | 5/1950 | Ospina | 60/317 |
| 3,082,597 | 3/1963 | Hamblin | 60/307 |
| 3,102,381 | 9/1963 | Tryhorn | 60/280 |
| 3,147,588 | 9/1964 | Tauschek | 60/294 |
| 3,192,706 | 7/1965 | Dolza | 60/294 |
| 3,503,716 | 3/1970 | Berger | 60/294 |
| 3,590,579 | 7/1971 | Takahashi | 60/294 |

*Primary Examiner*—Douglas Hart
*Attorney, Agent, or Firm*—James R. Ignatowski

[57] ABSTRACT

This invention relates to an air injection system injecting supplementary air into the exhaust manifold of an internal combustion engine for the purpose of oxidizing the unburned exhaust emissions, thereby reducing the emission of undesirable pollutants. The function of the system is to regulate the mass of air injected into the exhaust manifold providing a quantity of air sufficient for the complete oxidation of exhaust emissions without cooling the emissions below a temperature where the oxidation process is quenched. The inventive system, utilizing an engine driven air pump deriving its air supply from the engine's intake manifold, is operative to inject an air mass into the exhaust manifold proportional to the exhaust emissions.

7 Claims, 2 Drawing Figures

EXHAUST MANIFOLD AIR INJECTION SYSTEM

This is a continuation of application Ser. No. 221,576, filed Jan. 28, 1972.

BACKGROUND OF THE INVENTION

Injection of air into the exhaust manifold is a very effective means for reducing the hydrocarbon and carbon monoxide emissions from internal combustion engines. The injected air reacts with the emitted gases at the elevated exhaust temperatures and completes the oxidation of the unburned emissions. The effectiveness of the exhaust manifold air injection is improved substantially when the proper amount of air is mixed with the exhaust gases. An inadequate air supply results in incomplete oxidation while excessive air cools the exhaust gases below the reaction temperature and quenches the oxidation process. Varying proportions of air to exhaust can lead also to shifts in the oxidation mechanism causing significant efficiency loss. Generally, the air should be delivered to the exhaust manifold at a rate such that the oxygen content of the injected air is slightly higher than that necessary for complete oxidation of the emissions. This final oxidation process can take place in a normal exhaust manifold or can be enhanced through the use of thermal and/or catalytic reactors.

Presently, the quantity of air injected into the exhaust manifold is controlled by a positive displacement pump deriving its air supply from a filtered atmospheric pressure source driven by the engine giving a first order degree of control which is proportional to the speed of the engine. However, under certain engine operating conditions the air and fuel delivery to the engine are not proportional to the engine speed, and therefore second order, or auxliary control, must supplement the first order control provided by the positive displacement pump. This additional control is usually provided by auxiliary means, responding to engine operating conditions, which bleed off excessive air or terminate air injection into the exhaust manifold under predeterminable engine operating conditions.

The prior art as presented by U.S. Pat. Nos. 3,491,533, issued Jan. 27, 1970, to R. Schrag, and 3,082,597, issued Mar. 26, 1963, to R. J. J. Hamblin, describe exhaust manifold air injection systems; the latter system responsive to intake manifold pressure operative to cut off excessive air under predeterminable engine operating conditions.

Most future fuel delivery systems, in order to keep undesirable emissions to a minimum, will provide the engine with a fuel/air mixture having a fairly constant ratio of fuel to air. The gross composition of the exhaust emissions will therefore be relatively constant. The term "gross composition of exhaust emissions" is used to indicate generally the ratio of combustibles including the higher nitrogen oxides as well as the hydrocarbons and carbon dioxide to air, and does not mean the ratio of the individual byproducts formed in the engine during an operational cycle. In these systems where the gross composition of the exhaust gases is relatively constant the mass or quantity of air required for complete oxidation of the unburned emissions is proportional to the mass of the exhaust gas. The mass of the exhaust gas is proportional to the air mass inhaled by the engine and the air mass inhaled is proportional to the intake manifold absolute pressure and the rotational speed of the engine. Therefore, the quantity of air to be injected into the exhaust manifold is proportional to the rotational speed of the engine and the intake manifold absolute pressure.

The prior art uses engine driven pumps delivering a quantity of air proportional to the speed of the engine providing a first order control over the air mass being supplied the exhaust manifold. However, this art has found it necessary to use an auxiliary control system responsive to signals from intake manifold pressure sensors to provide a second order control necessary to compensate for changes in the mass of the exhaust gases due to pressure changes in the intake manifold. These auxiliary control systems are operative to regulate the air mass being delivered to the exhaust manifold by the pump. The inventive system eliminates the requirement for a separate second order auxiliary control for maintaining the ratio between the air mass injected into the exhaust manifold and the exhaust mass ejected by the engine. This is accomplished by having the engine driven pump, derive its air supply from the intake manifold downstream of the normally provided throttle valve. Using this technique, the air mass delivered by the air pump and injected into the exhaust manifold is directly proportional to the engine speed and intake manifold pressure and is therefore proportional to the air mass inhaled by the engine and therefore proportional to the expelled exhaust mass.

Proper design of the engine driven air pumping system, including connecting manifolds and driving means, can satisfy the exhaust air requirements for complete oxidation of the exhaust emissions. The obviousness of this invention is negated by the cited patents, both injection systems derive their filtered air supply from the air intake manifold upstream of the throttle valve.

SUMMARY OF THE INVENTION

The invention is an air injection system, injecting air into the exhaust manifold of an internal combustion engine to oxidize the unburned exhaust emissions, thereby reducing the emission of undesirable pollutants. The objective of the inventive air injection system is to regulate the mass of air injected into the exhaust manifold to provide a sufficient quantity of air for the complete oxidation of the exhaust emissions, yet limit the mass of injected air so that the injected air will not cool the exhaust gases below the reaction temperature of the air/exhaust emissions mixture and thereby quench the oxidation process. The control system utilizes an engine driven air pump providing a first order control over the mass of air delivered to the exhaust system which is proportional to the engine speed. Having the pump derive its air supply from the engine's intake manifold downstream of the throttle valve, the control system provides a second order control which is proportional to the air mass intake of the engine. Combining the control provided by the intake manifold absolute pressure with the engine speed, the system is operative to inject an air mass into the exhaust manifold which is proportional to the mass of the exhaust emissions. The advantages of the inventive system are: the mass of the air injected into the exhaust manifold is proportional to the mass of the exhaust produced thereby and hence the exhaust emissions, the elimination of auxiliary controls for second order correction to the injected air mass, and the system is immediately responsive to second order changes in the operational conditions of the engine which causes changes in the mass of the exhaust emissions independent of engine speed.

DETAILED DESCRIPTION OF THE PREFERRED EMBODIMENT

Figure 1:
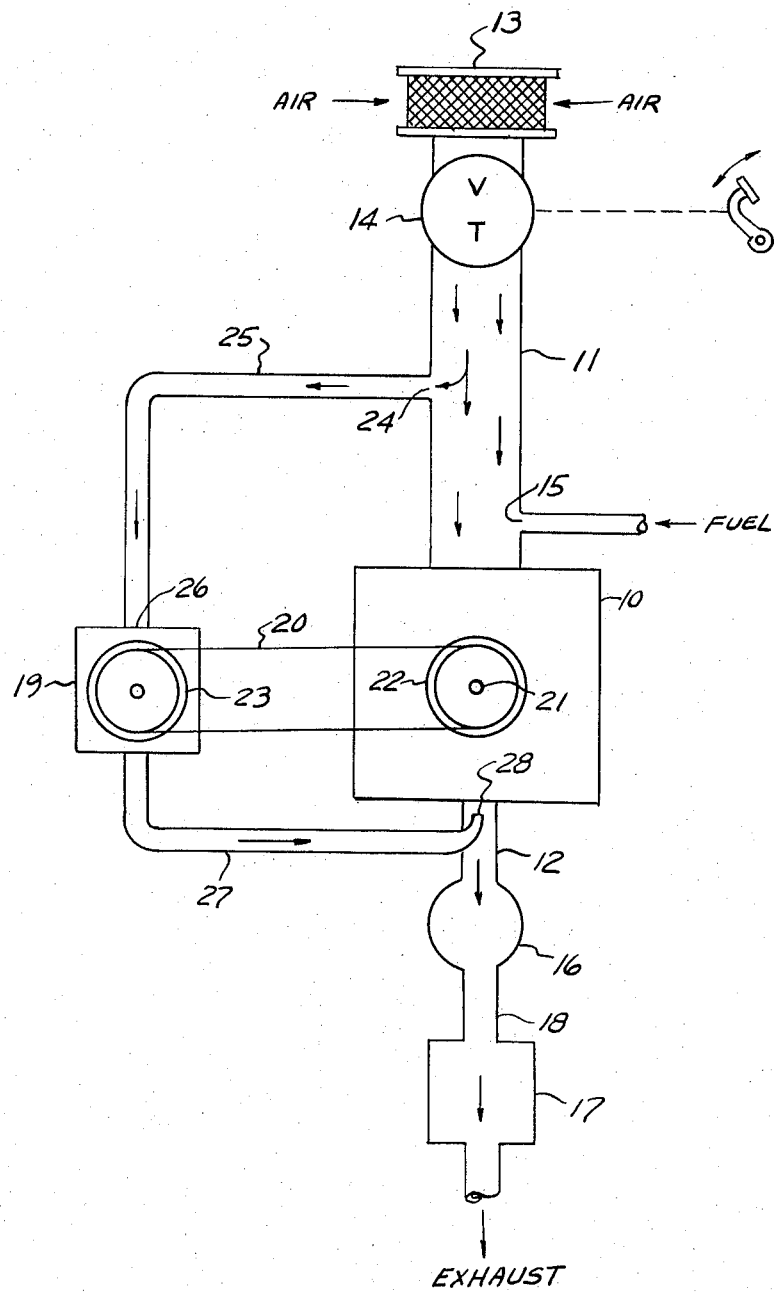
FIG. 1 is a schematic showing of the basic elements of an internal combustion engine with its air intake and exhaust systems and with the inventive exhaust air injection system mechanically driven.

The essential elements of an internal combustion engine system required for a description of a preferred embodiment of the inventive exhaust air injection system are shown in FIG. 1. The drawing shows a basic internal combustion engine assembly 10, an intake manifold 11, and an exhaust manifold 12. Atmospheric air enters the intake manifold 11 through the filter 13 past throttle valve 14 where it is mixed with fuel. FIG. 1 illustrates the fuel as being delivered to the intake manifold 11 through port 15. This mixture of fuel and air is inhaled by the engine 10 where the mixture is explosively ignited driving the reciprocating members in a piston type engine or rotation members in a Wankel or similar engine type. In some systems, the fuel is delivered directly to the engine combustion chamber rather than the intake manifold. The operational details of internal combustion engines are sufficiently well known by those versed in the art that the subsequent power producing combustion and exhaust cycles of the engine need not be explained in detail.

The partially burned air/fuel mixture is expelled from the engine into the exhaust manifold 12 and reaction chamber 16 where the burning or oxidation of the expelled gases is completed. The oxidized exhaust gases, the residue of the above process, after passing through the muffler 17 and connecting exhaust pipe 18, is ejected back into the atmosphere.

Figure 2:
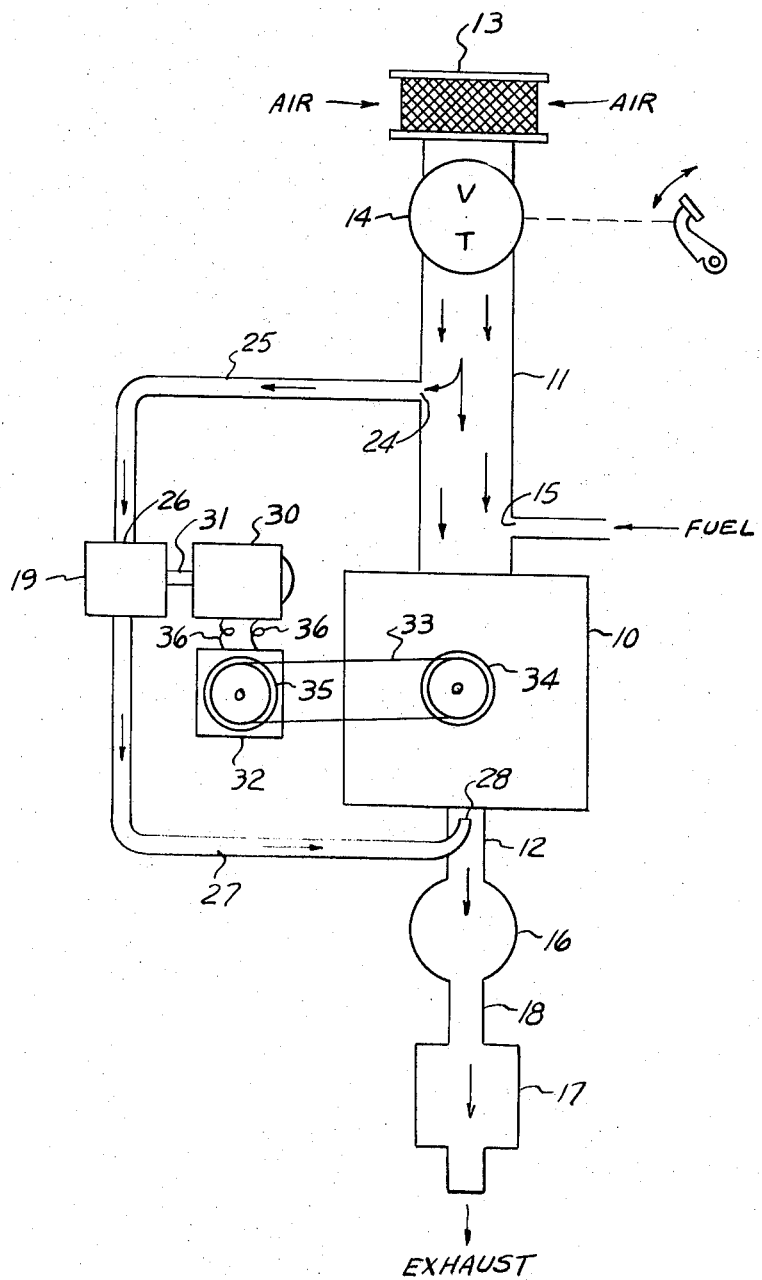
FIG. 2 is a schematic showing the basic elements of an internal combustion engine with its air intake and exhaust systems and with the inventive exhaust air injection system electrically driven.

The operation of the exhaust manifold air injection system of the present invention is as follows. An air pump 19 such as a positive displacement air pump is driven at a speed which is proportional to the speed of the engine. This may be accomplished by a variety of driving means, such as a belt or chain drive 20 mechanically linking the pump 19 to the rotational speed of the engine's crank shaft 21 as shown in FIG. 1. The diameters of the drive wheels on the engine and pump, wheels 22 and 23 respectively, determine the relative rotational speed of the air pump with respect to the speed of the engine, and provide a first order control over the air injected into the exhaust manifold. Other means, mechanical, electrical and otherwise, for driving an air pump at a speed proportional to the speed of the engine are known to those skilled in the art, and are equally applicable for the purposes of this invention. FIG. 2 illustrates an equivalent method wherein the air pump 19 is driven by an electric motor 30 via connecting shaft 31. The electric motor derives its engine speed signal and power from an electrical power source 32, such as an alternator, which is mechanically driven at a speed proportional to the speed of the engine 10 by an appropriate drive means, such as a belt drive 33, and pulley wheels 34 and 35. The electrical power is delivered to the motor 30 by means of electrically conductive wires 36. In the illustrated embodiment, the electrical power source 31 is an engine driven alternator, operative to produce alternating electrical power having an alternating frequency proportional to the speed of the engine. The electrical motor 30 driving the air pump 19 may be a synchronous motor operative to rotate at a speed proportional to the frequency of the energizing electrical power.

Referring again to FIG. 1, the air pump 19 derives its air supply from the intake manifold 11, via intake port 24 located on the side wall of the manifold 11 between the throttle valve 14 and the fuel delivery port 15. The air flows from the intake manifold 11 through port 24 and enclosed passage 25 to the air intake port 26 of the pump 19. The direction of the air flow is indicated by arrows in FIG. 1. After passing through the pump 19, the air flows through enclosed passage 27 to the injection port 28, where it is injected into the exhaust manifold 12 as close as possible to the entrance ports of the exhaust gases.

The air mass being pumped by the air pump 19 is proportional to the speed of the engine 10 and the absolute pressure of the air at the pump intake port 26. The enclosed passage is designed so that the pressure at the pump port 26 is approximately equal to the absolute pressure of the intake manifold 11. The air mass being pumped through the engine is also proportional to the speed of the engine and absolute pressure of the intake manifold. Since fuel delivery systems deliver fuel in proportion to the air mass inhaled by the engine, the gross composition of the exhaust gases will be proportional to the absolute pressure of the intake manifold and the speed of the engine. Therefore, the air mass injected into the exhaust manifold will be proportional to the mass of the exhaust gases emitted by the engine. Using the portion of the intake manifold downstream of the throttle valve as the source of air for the exhaust manifold air injection system provides the necessary second order air injection control maintaining a constant ratio between the air mass injected into the exhaust manifold and the mass of exhaust gases emitted by the engine. Opening or closing the throttle valve indicative of the operator's demand for acceleration or deceleration and changing the absolute pressure in the intake manifold will be effective in changing the air mass delivered to the exhaust manifold even before the engine speed has had time to change in response to the demand, giving the second order control an effective augmentation or override of the engine driven first order control. This inventive system provides an effective control of the air mass injected into the exhaust manifold under almost all normal operating conditions.

It is intended that the invention not be limited to the illustrated embodiment showing a particular type of internal combustion engine with a specific type of air intake and exhaust system, but rather the invention be extended to include the numerous types of internal combustion engines and their complementary air intake and exhaust subsystems.

What is claimed is:

1. In an internal combustion engine system having a primary engine assembly wherein a mixture of fuel and air are explosively ignited to produce a mechanical motion, a throttle controlled air intake manifold, a fuel delivery system delivering fuel to the engine assembly in proportion to the air mass being inhaled, and an exhaust system for directing the gases expelled from the engine assembly to the atmosphere, an improvement for injecting supplemental air into the exhaust system having a fixed ratio to the amount to the gases expelled by the engine thereby reducing the emission of undesirable exhaust gases into the atmosphere comprising:

an air pump;

driving means, interconnecting said pump with said engine, operative to drive said air pump at a speed proportional to the speed of said engine;

an enclosed input passage connecting said pump to the air intake manifold at a point therein downstream of the throttle and upstream of the fuel delivery system; and an enclosed output passage connecting said pump to the engine's exhaust system, wherein the mass of the supplemental air being injected into the engine's exhaust system from said pump is proportional to the speed of the engine and the throttle controlled less than ambient air pressure in the intake manifold downstream of the throttle.

2. The system as claimed in claim 1 wherein said air pump is a positive displacement air pump, operative to pump an air mass within a given period of time proportional to the operating speed of the pump and the absolute pressure of the air at the intake port of said pump.

3. In combination with an internal combustion engine system having a primary engine assembly wherein a mixture of fuel and air are explosively ignited to produce a mechanical motion, a throttle controlled air intake manifold, a fuel delivery system delivering fuel to the engine assembly in proportion to the air mass being inhaled, an exhaust manifold for directing the gases expelled from the engine assembly to the atmosphere, and an air injection system for injecting supplementary air into the exhaust manifold to enhance the oxidation of unburned gases being expelled by the engine, and reduce the emission of undesirable gases, an improvement for controlling the amount of supplementary air being injected into the exhaust manifold comprising:

an air pump;

driving means, interconnecting said pump with said engine, operative to drive said air pump at a speed proportional to the speed of said engine;

an enclosed input passage connecting said pump to the engine intake manifold downstream of the throttle and upstream of said fuel delivery system; and an enclosed output passage, connecting said pump to the engine's exhaust system, wherein the mass of the supplemental air being injected into the exhaust manifold by said pump is directly proportional to the speed of the engine and the throttle controlled air pressure in the intake manifold.

4. The system as claimed in claim 3 wherein said air pump is a positive displacement air pump, operative to pump an air mass proportional to the operating speed of the pump and the pressure of the air at the intake port of said pump.

5. An air injection system for supplying supplementary air to the exhaust manifold of an internal combustion engine system proportional to the amount of exhaust gases being emitted wherein said engine system comprises a primary engine assembly wherein a mixture of fuel and air are explosively ignited to produce a mechanical motion, a throttle controlled air intake manifold, a fuel delivery system delivering fuel to the engine assembly in proportion to the air mass being inhaled, and an exhaust system for directing the gases expelled from the engine assembly to the atmosphere, said air injection system comprising:

an air pump;

driving means, interconnecting said pump with said engine, operative to drive said air pump at a speed proportional to the speed of the engine;

an enclosed air input passage connecting said pump to said engine intake manifold, downstream of the throttle, and upstream of the fuel delivery system;

an enclosed air output passage, connecting said pump to the engine's exhaust system wherein the supplemental air being injected into the exhaust manifold by said pump is directly proportional to the speed of the engine and the throttle controlled air pressure in the intake manifold.

6. The system as claimed in claim 5 wherein said air pump is a positive displacement air pump, operative to pump an air mass within a given period of time, proportional to the operating speed of the pump and the absolute pressure of the air at the intake port of said pump.

7. In an internal combustion engine having a throttle controlled air intake manifold, a fuel delivery system connected downstream of the throttle for delivering fuel to the engine in proportion to the air being inducted, and an exhaust system for exhausting exhaust gases from the engine to the atmosphere, an improved air injected exhaust system for reducing the emission of certain exhaust gas constituents comprising:

an air injection conduit having an inlet end and an outlet end, said inlet end connected intermediate said throttle and said fuel delivery means so that pressure at said inlet end and at said fuel delivery system are substantially the same less-than-atmospheric pressure, and said outlet end connected to the engine exhaust system;

air pump means connected intermediate said inlet end and said outlet end of said conduit for controllably pumping air mass from said inlet end to said outlet end; and drive means connecting said air pump and said engine operative to drive said air pump at a speed proportional to the speed of said engine, whereby with the fuel delivery system and the air injection conduit inlet both exposed to substantially the same less-than-atmospheric pressure and with the air pump means pumping in proportion to the speed of the engine, the air mass injected into the control system is controlled to effect a predetermined ratio to the exhaust mass being expelled by the engine.

* * * * *